United States Patent
Zhu et al.

(10) Patent No.: US 7,449,259 B2
(45) Date of Patent: Nov. 11, 2008

(54) POWER CONVERTER ARCHITECTURE AND METHOD FOR INTEGRATED FUEL CELL BASED POWER SUPPLIES

(75) Inventors: Lizhi Zhu, Canton, MI (US); Richard J. Hampo, Plymouth, MI (US); Brian W. Wells, Vancouver (CA)

(73) Assignee: NuCellSys GmbH, Kirchheim/Teck-Nabern (DE)

( * ) Notice: Subject to any disclaimer, the term of this patent is extended or adjusted under 35 U.S.C. 154(b) by 616 days.

(21) Appl. No.: 10/654,872

(22) Filed: Sep. 4, 2003

(65) Prior Publication Data

US 2004/0219399 A1 Nov. 4, 2004

Related U.S. Application Data

(63) Continuation-in-part of application No. 10/426,942, filed on Apr. 29, 2003, now abandoned.

(51) Int. Cl.
H01M 8/12 (2006.01)
(52) U.S. Cl. .............. 429/23; 429/22; 429/13
(58) Field of Classification Search .......... 429/12, 429/34, 46
See application file for complete search history.

(56) References Cited

U.S. PATENT DOCUMENTS

| | | | |
|---|---|---|---|
| 4,411,967 A | 10/1983 | Yano | 429/23 |
| 6,096,449 A | 8/2000 | Fuglevand et al. | 429/13 |
| 6,187,464 B1 | 2/2001 | Yasumoto et al. | 429/13 |
| 6,424,545 B2 | 7/2002 | Burton | 363/21.12 |
| 6,428,918 B1 | 8/2002 | Fuglevand et al. | 429/13 |
| 6,442,047 B1 | 8/2002 | Cohen | 363/17 |
| 6,451,470 B1 | 9/2002 | Koschany et al. | 429/40 |
| 6,462,430 B1 | 10/2002 | Joong et al. | 290/40 C |
| 6,483,723 B2 | 11/2002 | Kuranuki et al. | 363/17 |
| 6,484,075 B2 | 11/2002 | Hasegawa et al. | 701/22 |
| 6,486,627 B1 | 11/2002 | Gabrys | 318/161 |
| 6,487,094 B1 | 11/2002 | Weng et al. | 363/21.12 |
| 6,490,175 B2 | 12/2002 | Raets et al. | 363/17 |
| 6,492,891 B2 | 12/2002 | Yamaguchi | 336/198 |
| 6,497,974 B2 | 12/2002 | Fuglevand | 429/22 |
| 6,504,735 B2 | 1/2003 | Negru et al. | 363/25 |

(Continued)

FOREIGN PATENT DOCUMENTS

| | | |
|---|---|---|
| DE | 44 31 747 A1 | 3/1995 |
| EP | 0 968 541 B1 | 4/1998 |
| JP | 8-162136 | 6/1996 |
| WO | WO 99/34465 | 7/1999 |

OTHER PUBLICATIONS

U.S. Appl. No. 60/421,126, filed May 16, 2002, Pearson.

(Continued)

*Primary Examiner*—Patrick Ryan
*Assistant Examiner*—Cynthia Lee
(74) *Attorney, Agent, or Firm*—Crowell & Moring LLP

(57) ABSTRACT

A fuel cell based power supply comprises a main power converter and control that allows the fuel cell stack to be electrically shorted from time-to-time to improve performance. Additionally, the power converter may temporarily disconnect the fuel cell stack from the load after shorting, allowing the fuel cell stack to return to an open circuit voltage, and/or provide current limiting during a period after shorting to provide stable operation while the fuel cell stack powers the load and recharges a power storage device.

15 Claims, 11 Drawing Sheets

U.S. PATENT DOCUMENTS

| | | | |
|---|---|---|---|
| 6,507,506 B1 | 1/2003 | Piñas et al. | 363/79 |
| 6,509,712 B1 | 1/2003 | Landis | 320/101 |
| 6,512,351 B2 | 1/2003 | Uematsu et al. | 320/166 |
| 6,515,455 B2 | 2/2003 | Hidaka | 320/135 |
| 6,515,872 B2 | 2/2003 | Nakayama et al. | 363/17 |
| 6,516,254 B1 | 2/2003 | Wakashiro et al. | 701/22 |
| 6,518,727 B2 | 2/2003 | Oomura et al. | 320/132 |
| 6,522,110 B1 | 2/2003 | Ivanov | 323/267 |
| 6,525,515 B1 | 2/2003 | Ngo et al. | 323/277 |
| 6,525,516 B2 | 2/2003 | Schultz et al. | 323/282 |
| 6,529,392 B2 | 3/2003 | Nishida et al. | 363/21.16 |
| 6,531,792 B2 | 3/2003 | Oshio | 307/109 |
| 6,531,853 B2 | 3/2003 | Umemoto | 323/282 |
| 6,573,682 B1 | 6/2003 | Pearson | 320/101 |
| 6,876,556 B2* | 4/2005 | Zhu et al. | 363/17 |
| 6,991,864 B2* | 1/2006 | Fredette | 429/22 |
| 2001/0044040 A1 | 11/2001 | Uribe et al. | 429/13 |
| 2002/0047309 A1 | 4/2002 | Droppo et al. | 307/43 |
| 2003/0111977 A1 | 6/2003 | Pearson | 320/101 |
| 2003/0113594 A1 | 6/2003 | Pearson | 429/9 |
| 2003/0113599 A1 | 6/2003 | Pearson | 429/23 |
| 2004/0174072 A1* | 9/2004 | Bourilkov et al. | 307/66 |
| 2004/0224192 A1* | 11/2004 | Pearson | 429/13 |

OTHER PUBLICATIONS

U.S. Appl. No. 60/436,759, filed Dec. 27, 2002, Pearson.

U.S. Appl. No. 10/426,942, filed Apr. 29, 2003, Zhu et al.

Gray, T. et al., "Fuel Cell Research: An Investigation of Non-Steady-State Operation," *NASA CR-54768*, Final Report, pp. 1-32, 1965.

Kronenberg, M., "Study Program to Improve Fuel Cell Performance by Pulsing Techniques," *NASA CR-54767*, Final Report, pp. 1-69, 1965.

Kronenberg, M., "Effects of Heavy Discharge Pulsing on Fuel Cell Electrodes," *Electrochemical Technology* 4(9/10):460-464, Sep.-Oct. 1966.

Sanderson, R. et al., "Pulsed Power Fuel Cells," *American Chemical Society Preprint Papers, Fuel Div.* 11(3):58-69, 1967.

\* cited by examiner

| Transition # | Starting State | Ending State | Conditions to Transit | Actions at the Transition |
|---|---|---|---|---|
| 1 | OFF | STANDBY (Customer requires to turn on the system) | WAKEUP = 0, FAN POWER ENABLE = 0, DC/DC ENABLE = 1 | Auxiliary power supply turned on. SW1 = OFF, SW2 = OFF, DC/DC = Disabled |
| 2 | STANDBY | OFF (To turn the system off) | WAKEUP = 1 | SW1 = OFF, SW2 = OFF. (Auxiliary power supply is off) |
| 3 | STANDBY | STARTUP | Minimum 30mS delay after the WAKEUP = 0, FAN POWER ENABLE = 1, DC/DC ENABLE = 1 | SW2 = ON (Fan power is connected to isolated auxiliary power supply) |
| 4, 7, 10 | STARTUP, IDLE, BOOST | FAULT | System Faults = TRUE | DC/DC = Disabled |
| 5 | STARTUP | STANDBY (To turn the fan power off) | FAN POWER ENABLE = 0, DC/DC ENABLE = 1 | SW1 = OFF, SW2 = OFF (Fan stops) |
| 6 | STARTUP | IDLE | Fuel Cell stack output voltage reaches the open circuit voltage FAN POWER ENABLE = 1, DC/DC ENABLE = 0 | SW2 = OFF, SW1 = ON (Fan Power is switched to Fuel Cell output) |
| 8 | IDLE | STARTUP (Remove all the load from Fuel Cell stack) | FAN POWER ENABLE = 1, DC/DC ENABLE = 1 | SW1 = OFF, SW2 = ON (Fan Power is switched to isolated auxiliary power supply) |

FIG. 3B

| | | | |
|---|---|---|---|
| 9 | IDLE | BOOST (Battery load side needs power from the DC/DC converter) | FAN POWER ENABLE = 0, DC/DC ENABLE = 0 | DC/DC = Enabled (DC/DC delivering power to the battery load side from Fuel Cell stack) |
| 11 | BOOST | IDLE (Battery load side doesn't need power from DC/DC converter) | FAN POWER ENABLE = 1, DC/DC ENABLE = 0 | DC/DC = Disabled (Fuel cell stack output only feeds the Fan Power) |
| 12 | FAULT | STANDBY (To clear the faults) | FAN POWER ENABLE = 0, DC/DC ENABLE = 1 | SW1 = OFF, SW2 = OFF, All faults are cleared, Fan stops. |

State Transition Matrix Notes:

1) For this matrix, the transition order implies precedence. This means that, for instance, if the current state is "engaged", the condition for transition to "off" is checked first and if the condition is true then the state transition is made without checking any other conditions.
2) The outputs are assumed to be persistent – that is if no action is taken to change any of the outputs during a given execution of the state machine, the last values for all of the outputs should still be used.
3) If no conditions for transitions are met, the state shall not change and no actions are to be taken.
4) Only one state transition is allowed per execution of the state machine.

FIG. 3C

I_Clamp Circuity V-V Curve

POWER CONVERTER ARCHITECTURE AND METHOD FOR INTEGRATED FUEL CELL BASED POWER SUPPLIES

BACKGROUND OF THE INVENTION

1. Field of the Invention

The present power converter architectures and methods generally relate to fuel cell systems, and more particularly to controlling an output power, voltage and/or current of a power supply including one or more fuel cell systems.

2. Description of the Related Art

Electrochemical fuel cells convert fuel and oxygen to electricity. Solid polymer electrochemical fuel cells generally employ a membrane electrode assembly ("MEA") which includes an ion exchange membrane or solid polymer electrolyte disposed between two electrodes typically comprising a layer of porous, electrically conductive sheet material, such as carbon fiber paper or carbon cloth. The MEA contains a layer of catalyst, typically in the form of finely comminuted platinum, at each membrane electrode interface to induce the desired electrochemical reaction. In operation, the electrodes are electrically coupled to conduct electrons between the electrodes through an external circuit. Typically, a number of MEAs are electrically coupled in series to form a fuel cell stack having a desired power output.

In typical fuel cells, the MEA is disposed between two electrically conductive fluid flow field plates or separator plates. Fluid flow field plates have flow passages to direct fuel and oxygen to the electrodes, namely the anode and the cathode, respectively. The fluid flow field plates act as current collectors, provide support for the electrodes, provide access channels for the fuel and oxygen, and provide channels for the removal of reaction products, such as water formed during the fuel cell operation. The fuel cell system may use the reaction products in maintaining the reaction. For example, reaction water may be used for hydrating the ion exchange membrane and/or maintaining the temperature of the fuel cell stack.

The stack's capability to produce current flow is a direct function of the amount of available reactant. Increased reactant flow increases reactant availability. Stack voltage varies inversely with respect to the stack current in a non-linear mathematical relationship. The relationship between stack voltage and stack current at a given flow of reactant is typically represented as a polarization curve for the fuel cell stack. A set or family of polarization curves can represent the stack voltage-current relationship at a variety of reactant flow rates. Fuel cell stacks are generally more efficient under low loads.

In most practical applications, it is desirable to maintain an approximately constant voltage output from the fuel cell system. One approach is to employ a battery electrically coupled in parallel with the fuel cell system to provide additional current when the demand of the load exceeds the output of the fuel cell stack and to store current when the output of the fuel cell stack exceeds the demand of the load.

The many different practical applications for fuel cell based power supplies require a large variety of different power/voltage delivery capabilities. Typically this requires using a fuel cell stack with a higher rating than actually required, or alternatively, specially designing the fuel cell stack for the particular application. In most instances, it is prohibitively costly and operationally inefficient to employ a power supply capable of providing more power than required by the application. It is also costly and inefficient to design, manufacture, validate, and maintain inventories of different power supplies capable of meeting the demand of each potential application (e.g., 1 kW, 2 kW, 5 kW, 10 kW, etc. in power, 24V, 48V, etc. in voltage). Further, it is desirable to increase the reliability of the power supply without significantly increasing the cost. Thus, a less costly, less complex, more flexible, and/or more efficient approach to fuel cell based power supplies is desirable.

BRIEF SUMMARY OF THE INVENTION

The fuel cell system and methods taught herein advantageously employ the switches of the DC/DC power converter to provide a current pulsing operation, including a short circuiting function, a recovery to open circuit voltage function, and a current limiting function during recharging, without the need for any additional circuitry.

In one aspect, a method of operating a fuel cell system, the fuel cell system comprising a main power converter comprising a first side and a second side, a fuel cell stack electrically coupled to the first side of the main power converter and a load electrically coupled to the second side of the main power converter, comprises determining when to start a current pulsing operation; and selectively operating a number of switches on the first side of the main power converter to produce a high current pulse from the fuel cell stack during a current pulsing period as at least a portion of the current pulsing operation. The method may comprises selectively operating a number of switches on the first side of the main power converter to produce the high current pulse from the fuel cell stack during a current pulsing period as at least a portion of the current pulsing operation comprises selectively operating the number of switches on the first side of the main power converter to electrically short the fuel cell stack during the current pulsing period. The method may further comprise driving an inductor electrically coupled in series with the fuel cell stack and at least one of a number of switches on the first side of the main power converter into saturation during the current pulsing period. The method may further comprise selectively operating a number of switches on the second side of the main power converter to electrically isolate the main power converter from the load during at least a portion of the current pulsing period. The method may additionally comprise selectively operating a number of switches on the first side and the second side of the main power converter to stop a current flow out of the second side of the main power converter during a bridge off period following the current pulsing period. The method may additionally comprise selectively operating a number of switches on at least one of the first and the second sides of the main power converter to limit a current flow out of the second side of the main power converter to a defined threshold during a current limiting period following the bridge off period.

In another aspect, a method of operating a power converter in a fuel cell system, the power converter comprising an input, an output, a transformer electrically coupled between the input and the output, a number of selectively operable primary side switches electrically coupled between the input and a primary side of the transformer, a number of selectively operable secondary side switches electrically coupled between the output and a secondary side of the transformer, and an inductor electrically coupled in series between the input and the primary side of the transformer, comprises boost converting a current from the first side of the transformer to the second side of the transformer during a boost converting period; closing the primary side switches to electrically short the fuel cell stack during a current pulsing period; opening the secondary side switches to electrically uncouple the secondary side of the transformer during the current pulsing period.

In yet another aspect, a fuel cell system comprises a main power converter comprising an input, an output, a first set of switches, a second set of switches, and an inductor electrically coupled in series between the input and at least one of the first set of switches; a fuel cell stack electrically coupled across the input of the main power converter; an power storage device electrically coupled across the output of the main power converter; and at least one controller coupled to control the switches of the main power converter, the controller configured to operate at least the first set of switches to boost convert a current from the fuel cell during a boost converting period and to operate the first set of switches to electrically produce a current pulse from the fuel cell stack during a current pulsing period following the boost converting period.

In a further aspect, a fuel cell system comprises a main power converter comprising an input, an output, at least one switch coupled between the input and the output and selectively operable to produce a short circuit path across the input, and an inductor electrically coupled in series between the input and the at least one switch; a fuel cell stack electrically coupled across the input of the main power converter; an power storage device electrically coupled across the output of the main power converter; and at least one controller coupled to control the at least one switch of the main power converter, the controller configured to operate the at least one switch to boost convert a current from the fuel cell during a boost converting period and to operate the at least one switch to electrically short the fuel cell stack during a current pulsing period following the boost converting period.

In an even further aspect, a fuel cell system comprises means for boost converting a current from a fuel cell stack during a boost converting period; and means for electrically producing a high current pulse from the fuel cell stack during a current pulsing period wherein the boost converting means and the high current pulse producing means have at least one switch in common.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements and angles are arbitrarily enlarged and positioned to improve drawing legibility. Further, the particular shapes of the elements as drawn, are not intended to convey any information regarding the actual shape of the particular elements, and have been solely selected for ease of recognition in the drawings.

FIGS. 3B and 3C are a state transition table for operating the fuel cell system according to the state transition diagram of FIG. 3A.

DETAILED DESCRIPTION OF THE INVENTION

In the following description, certain specific details are set forth in order to provide a thorough understanding of the various embodiments of the present power converter architectures and methods. However, one skilled in the art will understand that the present power converter architectures and methods may be practiced without these details. In other instances, well-known structures associated with fuel cells, fuel cell stacks, fuel cell systems, reactant delivery systems, power storage devices such as batteries and "super" or "ultra" capacitors, temperature control systems, controllers, and power converters such as DC/DC converters, have not been shown or described in detail to avoid unnecessarily obscuring descriptions of the embodiments of the present power converter architectures and methods.

Unless the context requires otherwise, throughout the specification and claims which follow, the word "comprises" and variations thereof, such as "comprises" and "comprising" are to be construed in an open, inclusive sense, that is as "including, but not limited to."

Figure 1:
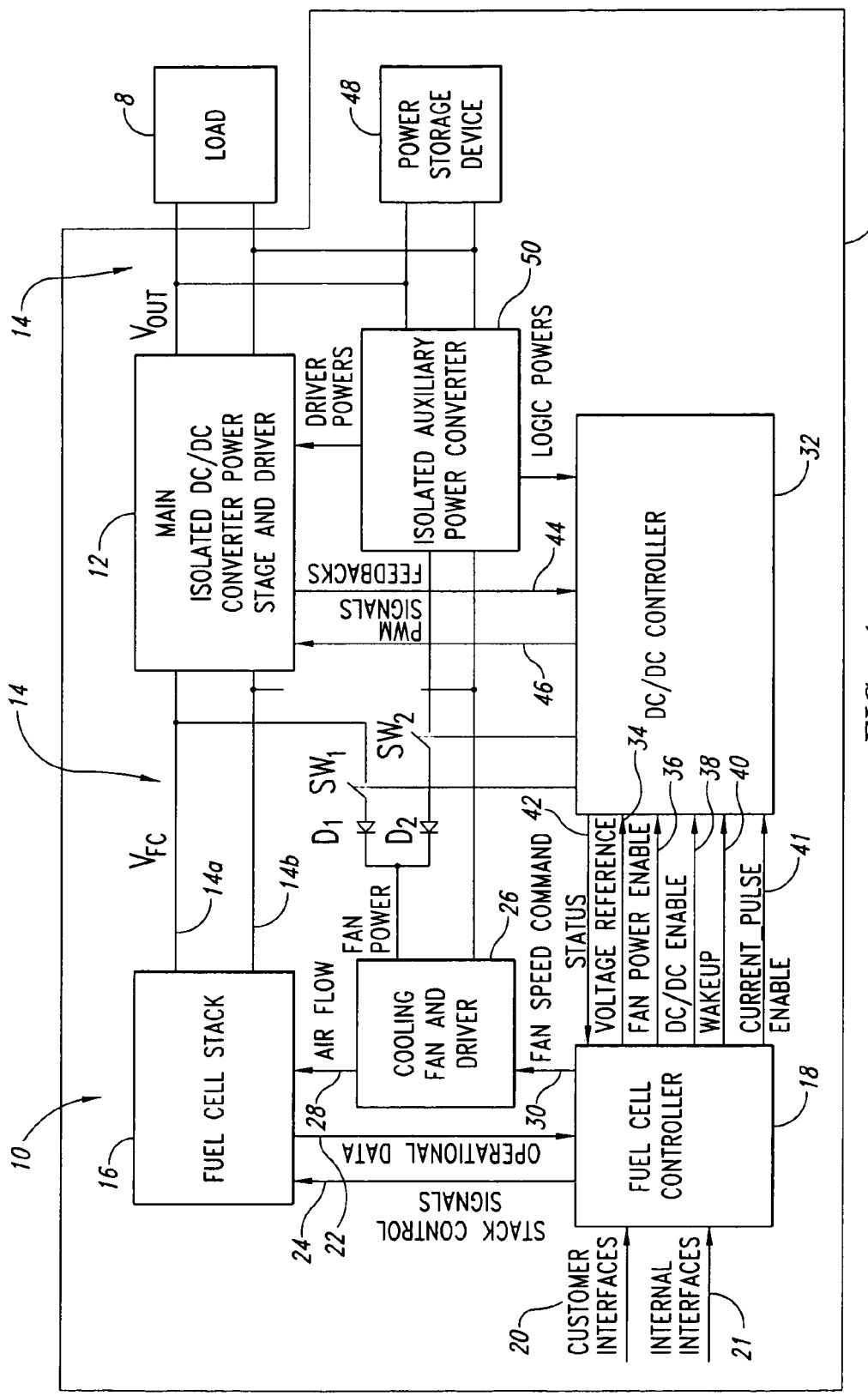
FIG. 1 is a schematic diagram of a fuel cell system powering an external load, the fuel cell system comprising a fuel cell stack, fan, main isolated power converter, isolated auxiliary power converter, power storage device, fuel cell controller, DC/DC controller and a pair of switches, according to one illustrated embodiment.

FIG. 1 shows a power supply 6 providing power to an external load 8 according to one illustrated embodiment of the present power converter architectures and methods. The external load 8 typically constitutes the device to be powered by the power supply 6, such as a vehicle, appliance, computer and/or associated peripherals, lighting, and/or communications equipment. The power supply 6 may also provide power to one or more internal loads, for example control electronics, as discussed below.

The power supply 6 comprises a fuel cell system 10, a main power converter 12, and a voltage bus 14.

Fuel cell system 10 comprises a fuel cell stack 16 composed of a number of individual fuel cells electrically coupled in series. The fuel cell stack 16 receives reactants, such as hydrogen and air via reactant supply systems (not shown) which may include one or more reactant supply reservoirs or sources, a reformer, and/or one or more control elements such as compressors, pumps and/or valves. Operation of the fuel cell stack 16 produces reactant product, typically including water. The fuel cell system 10 may reuse some or all of the reactant products. For example, the fuel cell system 10 may return some of the water to the fuel cell stack 16 to humidify the hydrogen and air at the correct temperature, to hydrate the ion exchange membranes, and/or to control the temperature of the fuel cell stack 16. Operation of the fuel cell stack 16 produces a voltage $V_{FC}$ across rails 14a, 14b of the voltage bus 14. In some embodiments, the voltage bus 14 electrically couples the fuel cell stack directly to a primary side of the main power converter 12 without the use of any intervening switches or diodes. This takes advantage of galvanic isolation between the fuel cell stack 16 and load 8, discussed in detail below. Eliminating unnecessary switches and diodes provides a number of benefits such as reducing the parts counts, reducing costs associated with high current rated devices such as high current rated power relays and high current rated diodes, and reducing the significant losses associated with such devices.

The fuel cell system 10 may include one or more controllers, such as fuel cell controller 18. The fuel cell controller 18 can take a variety of forms, for example, a microprocessor, application specific integrated circuit (ASIC), or other programmed or programmable integrated circuit and the like. The fuel cell controller 18 receives input from one or more customer interfaces 20 such as an ON/OFF switch, voltage adjusting switch, etc. The fuel cell controller 18 also receives operational data 22 for the fuel cell stack 16, for example, readings or measurements of temperature, reactant flows, and valve and/or switch conditions. The fuel cell controller 18 provides commands or stack control signals 24 to various actuators for controlling the operation of the fuel cell stack 16. For example, stack control signals 24 may actuate actuators such as solenoids for opening and closing valves to start, stop or adjust reactant flows.

The fuel cell system 10 includes one or more fans, such as a cooling fan 26 that is selectively operable to provide an air flow 28 for maintaining the temperature of the fuel cell stack 16 within acceptable bounds or reactant supply fan for supplying fuel or oxidant (e.g., air or oxygen) to the fuel cell stack 16. The fuel cell controller 18 may control the cooling fan 26 via fan speed commands 30.

Figure 2:
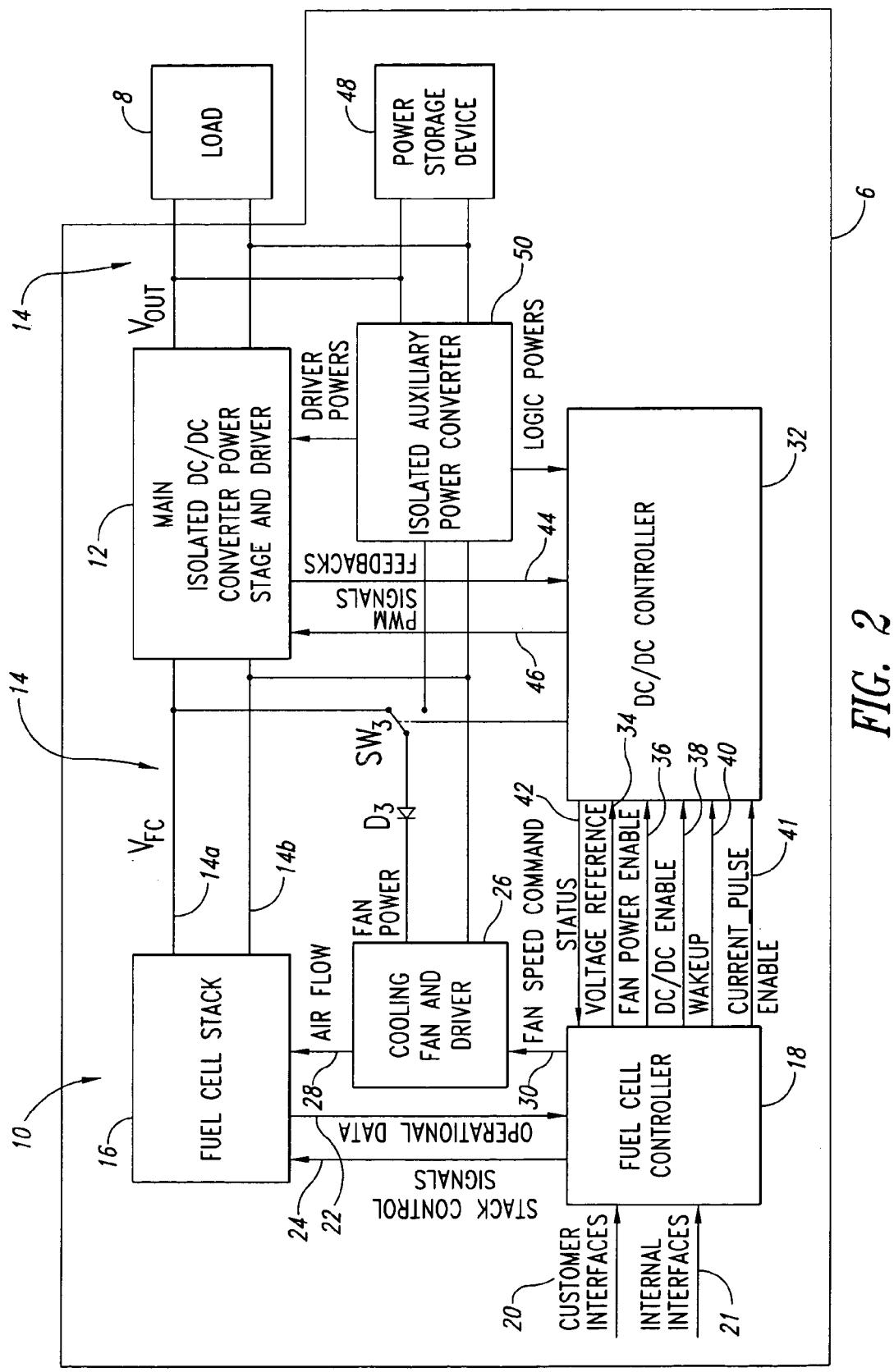
FIG. 2 is a schematic diagram of the fuel cell system including a single throw, double pole switch, according to one alternative embodiment.

The main power converter 12 may take a variety of forms such as a full-bridge DC/DC converter, a pus-pull DC/DC converter, a half-bridge DC/DC converter, a forward DC/DC converter, or their derivatives. For example, the main power converter 12 may take the form of an isolated, full-bridge DC/DC converter power stage and driver electrically coupled on the voltage bus 14 between the fuel cell stack 16 and the load 8, as illustrated in FIGS. 1 and 2. In the illustrated embodiment, the main power converter 12 is operable to convert the DC voltage $V_{FC}$ produced by the fuel cell stack 16 to a desired DC output voltage $V_{OUT}$ suitable for the load 8.

A variety of DC/DC converter topologies may be suitable, which typically employ semiconductor switching devices in a circuit that uses an inductor, a transformer or a capacitor as an energy storage and filter element to transfer energy from the input to the output in discrete packets or pulses. For example, the DC/DC converter may employ a full-bridge DC/DC converter topology, a push-pull DC/DC converter topology, a half-bridge DC/DC converter topology, or a forward DC/DC converter topology. In particular, the main power converter 12 may employ a high switching frequency (e.g., 100 kHz) approach, in order to reduce size, cost and weight. The details of these and other suitable converter topologies will be apparent to those of skill in the art. The main power converter 12 may rely on the galvanic isolation inherent in the transformer in the main power converter 12 to provide isolation between a primary side and a secondary side of the main power converter 12.

The main power converter 12 is operable under a variety of control techniques, such as frequency modulation, pulse-width modulation (i.e., PWM), average-current control, and peak-current control, as will be apparent to those of skill in the art.

The power supply 6 may include one or more power converter controllers to control the main power converter 12 via appropriate drivers, for example, a DC/DC controller 32. The DC/DC controller 32 may operate in conjunction with the fuel cell controller 18, communicating data and/or commands therebetween. For example, the fuel cell controller 18 may provide to the DC/DC controller 32: a voltage reference signal 34 representing the value of a desired output voltage $V_{OUT}$, a fan enable signal 36 identifying a state (e.g., ON/OFF; High, Medium, Low) of the cooling fan 26, a DC/DC enable signal 38 identifying a desired state (e.g., ON/OFF) of the main power converter 12, and/or a wakeup signal 40 identifying a state (e.g., ON/OFF) of main power converter 12. The DC/DC controller 32 may provide a status signal 42 to the fuel cell controller 18 identifying an operational status of the DC/DC controller 32 and/or main power converter 12. The DC/DC controller 32 may also receive feedback signals 44 from the main power converter 12. The DC/DC controller 32 produces control signals, such as pulse width modulated signals 46, to control the operation of the main power converter 12 via appropriate drivers. Since some embodiments directly couple the fuel cell stack 16 to the main power converter 12 without any intervening switches and/or diodes, the operation of the main power converter 12 serves as the ON/OFF control between the fuel cell stack 16 and main power converter 12 and/or load 8. Thus, power from the fuel cell stack 16 can be turned ON and OFF by enabling and disabling the main power converter 12.

The power supply 6 may also include an power storage device 48, such as a "super" or "ultra" capacitor and/or a battery, electrically coupled in parallel across the load 8, at the output side of the main power converter 12. The open circuit voltage of the power storage device 48 is selected to be similar to the desired maximum output voltage of the power supply 6. An internal resistance of the power storage device 48 is selected to be much lower than an internal resistance of the main power converter 12, thus the power storage device 48 acts as a buffer, absorbing excess current when the fuel cell stack 16 produces more current than the load 8 requires, and providing current to the load 8 when the fuel cell stack 16 produces less current than the load 8 requires. The coupling of the power storage device 48 across the load 8 reduces the maximum power rating requirement of the fuel cell stack 16. The power storage device 48 also supplies energy to the internal loads of the power supply 6 when the fuel cell stack 16 is, for example, in a startup state, failure state and/or standby state, as more fully discussed below.

The power supply 6 includes an auxiliary power converter 50 to provide power to the various internal loads of the fuel cell system 10. For example, the auxiliary power converter 50 may provide power to the main power converter 12, the DC/DC controller 32 and/or the fuel cell controller 18. A single auxiliary power converter 50 may also supply power to other internal loads of the fuel cell system for example the cooling fan 26. Thus, the architecture of the power supply 6 takes advantage of the existing auxiliary power converter used to power the control circuitry (e.g., DC/DC controller 32, fuel cell controller 18) to eliminate a dedicated cooling fan power supply typically found in fuel cell systems. The auxiliary power converter 50 may take the form of a widely-used flyback converter. The auxiliary power converter 50 may be isolated, for example, relying on the galvanic isolation associated with the flyback transformer in the auxiliary power converter 50, to provide protection between the remainder of the power supply 6 and/or the load 8.

The power supply 6 may employ one or more switches selectively operable to supply power to the cooling fan 26 directly from the fuel cell stack 16, or alternatively, supply power to the cooling fan 26 via the auxiliary power converter 50. For example, a first switch $SW_1$ may electrically couple the cooling fan 26 to the voltage bus 14 in a closed state, and electrically uncouple the cooling fan 26 from the voltage bus 14 in an open state. A second switch $SW_2$ may electrically couple the cooling fan 26 to the auxiliary power converter 50 in a closed state, and electrically uncouple the cooling fan 26 from the auxiliary power converter 50 in an open state. The DC/DC controller 32 may control the state (e.g., ON/OFF) of the switches $SW_1$, $SW_2$ in response to the fuel cell controller 18. The power supply 6 may further include a pair of diodes $D_1$, $D_2$ to protect against reverse current flow.

FIG. 2 shows an alternative embodiment of the power supply 6. This alternative embodiment, and those alternative embodiments and other alternatives described herein, are substantially similar to previously described embodiments, and common acts and structures are identified by the same reference numbers. Only significant differences in the operation and structure are described below.

In particular, the power supply 6 of FIG. 2 employs a single switch $SW_3$ in place of the first and second switches $SW_1$, $SW_2$, and a single diode $D_3$. The switch $SW_3$ is selectively operable to alternatively electrically couple the cooling fan 26 directly to the fuel cell stack 16 or to the power storage device 48 via the auxiliary power converter 50. This alternative embodiment may be simpler to operate and less costly than the embodiment of FIG. 1, but may not be capable of functioning under several of the operating states discussed below.

Figure 3A:
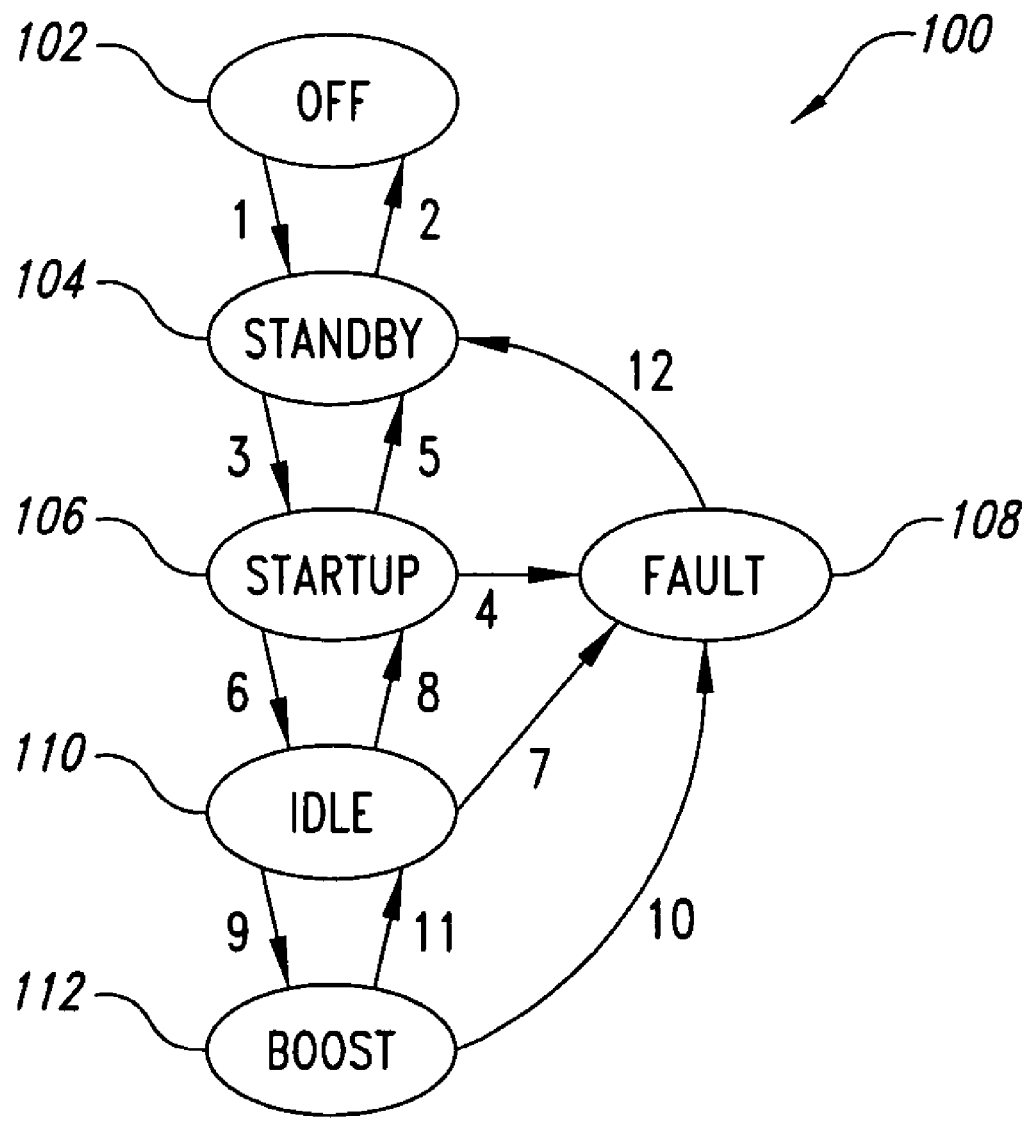
FIG. 3A is a state transition diagram for operating the fuel cell system according to one illustrated embodiment.

FIG. 3A is a state transition diagram and FIGS. 3B and 3C are a state transition table illustrating a state machine 100 for operating the power supply 6.

The state machine 100 involves a variety of states or operating modes, some of which are activated by a user selecting an appropriate control on the customer interface 20, and others which are automatically entered via the fuel cell controller 18 and/or DC/DC controller 32 in response to certain operating conditions.

FIG. 3A shows the valid transitions for the state machine 100. For example, the power supply 6 may transition from an off state 102 to a standby state 104. The power supply 6 may transition from the standby state 104 to the off state 102 or to a startup state 106. The power supply 6 may transition from the startup state 106 to the standby state 104, to a fault state 108, or to an idle state 110. The power supply 6 may transition from the fault state 108 to the standby state 104. The power supply 6 may transition from the idle state 110 to the fault state 108 or to a boost state 112. The power supply 6 may transition from the boost state 112 to the fault state 108 or the idle state 110.

The above transitions are represented by arrows on the state transition diagram (FIG. 3A), each of the arrows having a reference number that identifies the transitions in the state transition table (FIGS. 3B and 3C).

The off state 102 is the beginning state for the power supply 6. In the off state 102 the various subsystems such as the fuel cell stack 16, main power converter 12, fuel cell controller 18, cooling fan 26, DC/DC controller 32 and/or auxiliary power converter 50 are not operating.

The standby state 104 maintains the controllers in an operational state after receiving the wake-up command, while the housekeeping power supply for controllers is activated, and controllers in power supply 6 are awake and ready to communicate with customer interface 20. The standby state 104 may be activated by an appropriate user input via the customer interface 20. To enter the standby state 104, the fuel cell controller 18 causes the DC/DC controller 32 to open the first switch $SW_1$, if not already open, to electrically uncouple the cooling fan 26 from the fuel cell stack 16. The fuel cell controller 18 also causes the DC/DC controller 32 to open the second switch $SW_2$, if not already open, to electrically uncouple the cooling fan 26 from the auxiliary power converter 50. The fuel cell controller 18 further disables the fuel cell stack 16, for example, by stopping reactant flow to the fuel cell stack 16. The fuel cell controller 18 further causes the DC/DC controller 32 to disable the main power converter 12.

The startup state 106 may be entered in response to the user selecting an appropriate ON/OFF switch, or the automatic sensing of a loss of power from an independent power source such as a public or private electrical grid. The startup state 106 may allow the various subsystems of the power supply 6 to come up to operational levels, for example, allowing the fuel cell stack 16 to come up to its open circuit voltage $V_{OC}$. To enter the startup state 106, the fuel cell controller 18 causes the DC/DC controller 32 to open the first switch $SW_1$, if not already open, in step 106 to electrically uncouple the cooling fan 26 from the voltage bus 14. The fuel cell controller 18 also causes the DC/DC controller 32 to close the second switch $SW_2$, if not already closed, to electrically couple the cooling fan 26 to the power storage device 48 to receive power via the auxiliary power converter 50.

The fault state 108 may be entered when one or more operating values go out of bounds or some other erroneous condition occurs, the failure state protecting the various subsystems of the power supply 6, as well as the load 8. To enter the fault state 108, the fuel cell controller 18 causes the DC/DC controller 32 to open the first switch $SW_1$, if not already open, to electrically uncouple the cooling fan 26 from the voltage bus 14. The fuel cell controller 18 also causes the DC/DC controller 32 to disable the main power converter 12. The fuel cell controller 18 further causes the DC/DC controller 32 to close the second switch $SW_2$, if not already closed, to electrically couple the cooling fan 26 to the power storage device 48 via the auxiliary power converter 50.

The idle state 110 may be entered to maintain the power supply 6 in an operational state, while the load 8 does not require power. The idle state 110 may be activated by an appropriate user input via the customer interface 20, or by automatically sensing of the loss of load 8. To enter the idle state 110, the fuel cell controller 18 causes the DC/DC controller 32 to open the second switch $SW_2$, if not already open, to electrically uncouple the cooling fan 26 from the auxiliary power converter 50. The fuel cell controller 18 also causes the DC/DC controller 32 to close the first switch $SW_1$, if not already closed, to electrically couple the cooling fan 26 directly to the fuel cell stack 16 via the voltage bus 14. The fuel cell controller 18 further causes the DC/DC controller 32 to disable the main power converter 12.

The boost state 112 may be entered once the power supply 6 is fully operational, to supply power to the load 8. The boost state 112 may be activated by an appropriate user input via the customer interface 20, or by automatically sensing of the load 8. To enter the boost state 112, the fuel cell controller 18 causes the DC/DC controller 32 to open the second switch $SW_2$, if not already open, to electrically uncouple the cooling fan 26 from the auxiliary power converter 50. The fuel cell controller 18 also causes the DC/DC controller 32 to close the first switch $SW_1$, if not already closed, to electrically couple the cooling fan 26 directly to the fuel cell stack 16 via the voltage bus 14. The fuel cell controller 18 further causes the DC/DC controller 32 to provide PWM signals 46 to the main power converter 12, enabling the main power converter 12 in order to supply power to the load 8 from the fuel stack 16.

Figure 4:
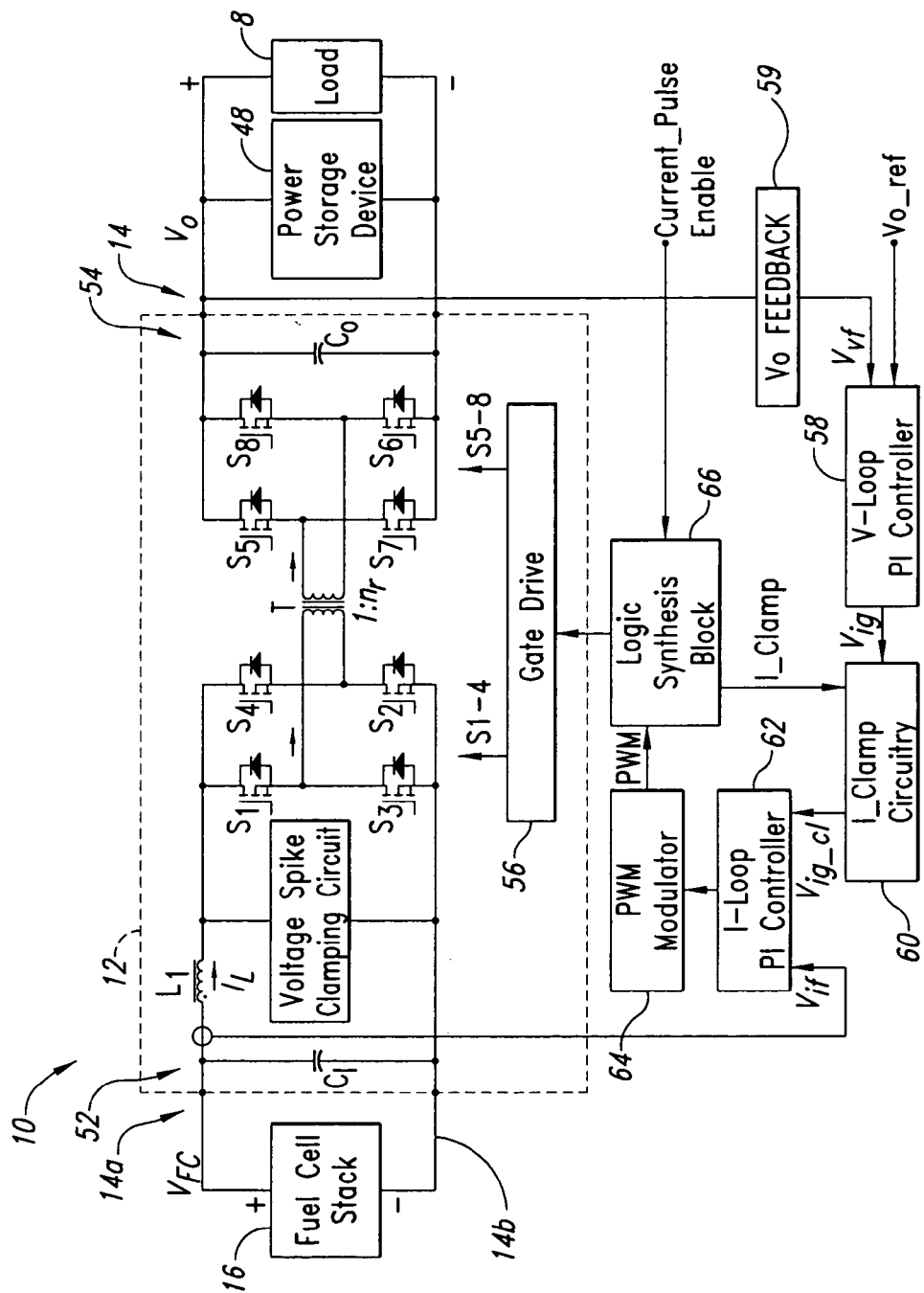
FIG. 4 is a schematic diagram of a fuel cell system powering an external load, the fuel cell system comprising a fuel cell stack, main isolated DC/DC power converter, power storage device, and DC/DC power converter control logic, according to one illustrated embodiment.

FIG. 4 shows a further embodiment of the fuel cell system 10 illustrating the main DC/DC power converter 12 and drive circuitry in further detail.

In the illustrated embodiment, the DC/DC power converter 12 takes the form of an isolated boost type DC/DC converter, comprising a first or primary side 52, a second or secondary side 54 and a transformer T having a primary winding and a secondary winding to provide galvanic isolation between the primary and secondary sides 52, 54, respectively. The primary side 52 of the DC/DC power converter 12 is electrically coupled the fuel cell stack 16 and the secondary side 54 is electrically coupled to the load 8 and power storage device 48.

The primary side 52 of the DC/DC converter includes a full bridge (i.e., $S_1$, $S_2$, $S_3$, $S_4$ and associated diodes) comprising two half bridges, where each half bridge is formed by a pair of switches (i.e., $S_1$, $S_3$ and $S_2$, $S_4$). Each pair of switches is electrically coupled between the positive and negative rails of the voltage bus 14, one of the switches in each pair denominated as the high switch (i.e., $S_1$, $S_4$) and the other switch in each pair denominated as the low switch (i.e., $S_3$, $S_2$). The poles of the primary winding of the transformer T are electrically coupled between respective switch pairs $S_1$, $S_3$ and $S_4$, $S_2$.

The primary side 52 of the DC/DC power converter 12 further includes a boost inductor $L_1$ electrically coupled in series on the positive rail of the voltage bus 14 and a capacitor $C_1$ electrically coupled across the voltage bus 14. The boost inductor $L_1$ is an energy storage and filter device for a boost converter and the capacitor $C_1$ filters and smoothes the output voltage. The boost inductor $L_1$ also controls and reduces the rate of change di/dt of the current pulse, reducing the electromagnetic interference (EMI) emissions for the fuel cell system 10. Furthermore, the smaller di/dt current pulse reduces the current stress out of the capacitor $C_1$. The primary side 52 may also include a voltage spike clamping circuit, as is commonly known in the art.

The secondary side 54 of the DC/DC power converter 12 also includes a full bridge comprising two half bridges, where each half bridge is formed by a pair of switches (i.e., $S_5$, $S_7$ and $S_6$, $S_8$ and associated diodes). Each pair of switches is electrically coupled between the positive and negative rails of the voltage bus 14, one of the switches in each pair denominated as the high switch (i.e., $S_5$, $S_8$) and the other switch in each pair denominated as the low switch (i.e., $S_7$, $S_6$). The poles of the secondary winding of the transformer T are electrically coupled between respective switch pairs $S_5$, $S_7$ and $S_8$, $S_6$.

The secondary side 54 may also include an output capacitor $C_O$ electrically coupled across the voltage bus 14.

The switches $S_1$-$S_8$ may take the form of metal oxide semiconductor field effect transistors (MOSFETs) or other suitable switching devices, for example, integrated gate bipolar transistors (IGBTs). MOSFETs are commercially available, typically with a respective body diode coupled across each of the MOSFETs. The switches $S_1$-$S_8$ are driven via a gate drive 56 which may be part of the main DC/DC power converter 12 or may be separately provided.

Control logic may be implemented in hardware and/or software, for example, the control logic may be implemented in the DC/DC controller 32. An example of suitable control logic is described immediately below with continuing reference to FIG. 4.

A voltage-loop proportional integral (PI) controller 58 receives a voltage feedback signal $V_{VF}$ from out voltage feed back circuit 59, corresponding to a voltage measured at an output of the secondary side 54 of the DC/DC power converter 12. The output voltage feedback circuit 59 isolates and amplifies the feedback voltage $V_{VF}$ with respect to the out voltage $V_O$, for example, via an opto-isolator. Thus, while the feedback voltage $V_{VF}$ is indicative of the output voltage $V_O$, the feedback voltage $V_{VF}$ has been isolated and amplified. The voltage-loop PI controller 58 also receives a signal $V_{O\_REF}$ indicative of a reference voltage. The voltage-loop PI controller 58 provides a signal $V_{ig}$ proportional to the integral of the difference between the measured voltage and the reference voltage.

A current clamp circuitry 60 receives the proportional signal $V_{ig}$ from the voltage-loop PI controller 58. The current clamp circuitry 60 also receives a current clamping enable signal I_Clamp from a logic synthesis block 66 indicative of a current clamping condition (e.g., ON/OFF). The current clamp circuitry 60 produces a signal $V_{ig\_cl}$ indicative of a voltage corresponding to the resulting current which is clamped or unclamped dependent on the current clamping condition.

A current-loop PI controller 62 receives the signal $V_{ig\_cl}$ and receives a signal $V_{if}$ indicative of an inductor current measured at an input of the primary side 52 of the DC/DC power converter 12. The current-loop PI controller 62 produces a signal indicative of the integral of a difference between the two input signals. A pulse width modulation (PWM) modulator 64 receives the resulting output of the current-loop PI controller 62 and produces a corresponding PWM signal by varying a duty cycle of the PWM signal.

The logic synthesis block 66 receives the PWM signal from the PWM modulator 64 and receives a current pulsing enable signal CURRENT_PULSE ENABLE over a current pulse enable line 41. The logic synthesis block 66 also generates corresponding ON/OFF PWM signals for switches $S_1$-$S_8$ to provides the PWM signals to the gate drive 56. The current pulsing enable signal CURRENT_PULSE ENABLE indicates whether current pulsing operation should begin. The current pulsing enable signal CURRENT_PULSE ENABLE may, for example, be generated by the fuel cell controller 18 (FIG. 1). The logic synthesis block applies a defined logic to drive the gate drive 56 according to the PWM signal and the current pulsing enable signal CURRENT_PULSE ENABLE.

Figure 5:
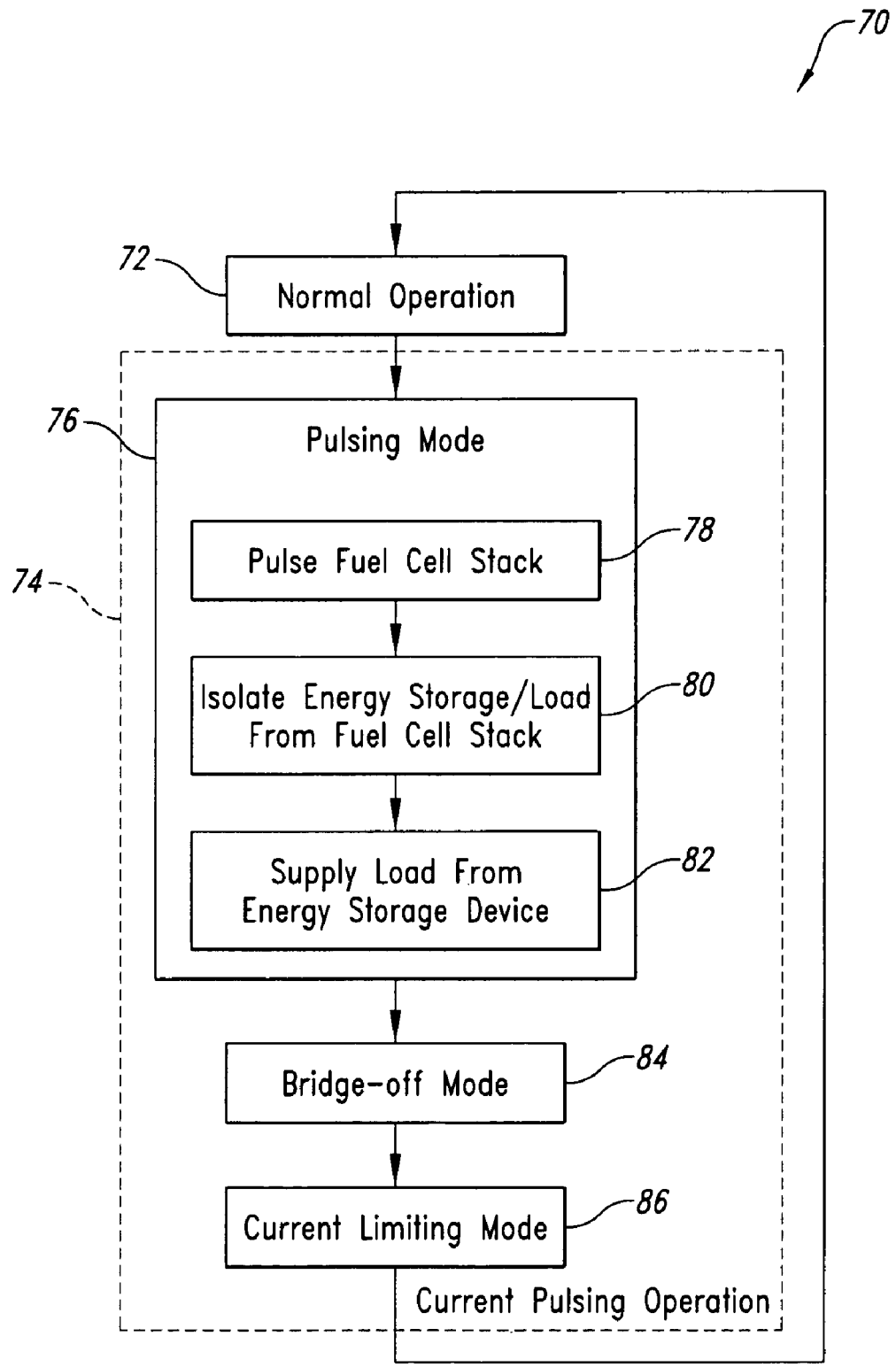
FIG. 5 is a flow diagram of a method of operating the fuel cell system of FIG. 4 according to one illustrated embodiment.

FIG. 5 shows a method 70 implemented by the logic discussed immediately above.

In step 72, the DC/DC power converter 12 begins normal operation. Typically, normal operation includes selectively operating the switches $S_1$-$S_4$ for boost converting power supplied from the fuel cell stack 16 to the load 8 and/or power storage device 48 in a conventional manner by switching the voltage across the primary winding of the transformer T.

The switches $S_5$-$S_8$ on the secondary side 54 may also be selectively operated to rectify the current from the secondary winding of the transformer T, or alternatively, the DC/DC power converter 12 may employ passive rectification on the secondary side 54. The DC/DC controller 32 and/or gate drive 56 may employ synchronized rectification control logic to control the switches $S_5$-$S_8$ to improve the overall operational efficiency of the DC/DC power converter 12. Synchronization control logic helps to reduce conduction loss of the secondary side 54 switches $S_5$-$S_8$, particularly where the current in the secondary side 54 is high, for example in relatively low voltage applications (e.g., 24V, 48V, 72V battery charger, 20-30V versus 200-450V).

In step 74, the DC/DC power converter 12 begins a current pulsing operation. The current pulsing operation may be triggered by detecting a voltage drop across all or a portion of the fuel cell stack 16, or may be triggered based on a time or duration, for example, periodically based on a number of minutes (e.g., once a minute) of continuous or cumulative operation of the fuel cell stack 16.

During the current pulsing operation, the DC/DC power converter 12 enters a current pulsing mode in step 76 during a current pulsing period. As part of the current pulsing mode, the DC/DC power converter 12 produces a current pulse in step 78. For example, the DC/DC power converter 12 turns ON (i.e., closes) each of the switches $S_1$-$S_4$ on the primary side 52 of the DC/DC power converter 12 to produce a short circuit across the fuel cell stack 16 for the duration of the current pulsing period. Short circuiting of the fuel cell stack 16 causes a high current pulse that improves the performance of the fuel cell stack 16. A performance improvement may result for various reasons. For example, a performance improvement may result from the elimination of oxides that build up on the cathode catalyst structures (not shown) in the fuel cell stack 16, or from the removal of carbon monoxide adsorbed on the anode of the catalyst (not shown). Advantageously, the fuel cell system 10 employs the switches $S_1$-$S_4$ of the DC/DC power converter 12 to provide the short circuiting function, without the need for any additional circuitry.

During the current pulsing period, the switches $S_5$-$S_8$ on the secondary side 54 of the DC/DC power converter 12 may be turned OFF (i.e., open) in step 80 to electrically uncouple the power storage device 48 and/or load 8 from the fuel cell stack 16. Turned OFF the switches $S_5$-$S_8$ prevents the flow of a return of current to the fuel cell stack 16 from either the power storage device 48 or load 8, thereby protecting the fuel cell stack 16.

Also during the current pulsing period, the power storage device 48 may provide power to the load 8 in step 82.

At the end of the current pulsing period, the DC/DC power converter 12 enters a bridge-off mode in step 84 during a bridge-off period. Each of the switches $S_1$-$S_4$ on the primary side 52 are turned OFF (i.e., open) for the duration of the bridge-off period. At this point, the voltage $V_{FC}$ of the fuel cell stack 16 ramps up towards an open circuit voltage $V_{OC}$. Rather than immediately beginning normal operation, the bridge-off mode temporarily stops the operation of the DC/DC power converter 12, allowing the voltage of the fuel cell stack 16 to recover to the open circuit voltage $V_{OC}$ without loading, thus enabling stable operation of the fuel cell stack 16 after starvation.

During the bridge-off period, each of the switches $S_5$-$S_8$ on the secondary side 54 of the power converter 12 may remain in the OFF state (i.e., open) to prevent the backflow of current from the power storage device 48 to the transformer T.

As described above, during current pulsing mode and bridge-off mode the power storage device 48 has been providing the power to the load 8. Thus, the power storage device 48 has been discharging during these periods, and the terminal voltage of the power storage device 48 has been dropping. After the bridge-off period ends and the DC/DC converter 12 is enabled, the total equivalent load applied to the fuel cell stack 16 is therefore the sum of the load 8 and the load associated with recharging the power storage device 48. This combined load will likely overload the fuel cell stack 16 during the transient operation, pulling the fuel cell stack 16 buck into a low efficiency high current operating regime. If this occurs, the fuel cell system 10 can be trapped in an undesired operating point from which it is difficult to recover.

While a brief "pulsing" helps improve the performance of the fuel cell stack 16, the current draw from the fuel cell stack 16 during pulsing is typically higher than the current draw for peak power output. Current pulsing is an inefficient operating regime for the fuel cell stack 16. Thus, it is undesirable to operate the fuel cell stack 16 above the peak power point after the "pulsing" is performed. During pulsing of the fuel cell system 10, control is no longer based on providing power to the external load. In some instances, this may lead to incorrect control (e.g., if peak power output is desired, the current may either have to be increased or decreased depending on which side of the peak power curve the fuel cell system 10 is operating). Thus, it is desirable to prevent overloading the fuel cell system 10 for the sake of efficiency, as well as for the sake of maintaining adequate control over the fuel cell system 10.

To alleviate or prevent this undesirable condition, the DC/DC power converter 12 enters a current limiting mode in step 86 for the duration of a current limiting period, which follows the bridge-off period. The current limiting mode assists the fuel cell system 10 to operate in a stable manner during the current pulsing operation, especially at full load conditions. The current limiting mode is designed to limit the current/power from the fuel cell stack 16 after pulsing, which stabilizes the fuel cell stack 16 during the transient, and prevents the fuel cell stack 16 from overloading.

In particular, the current clamping enabling signal I_Clamp is provided from the logic synthesis block 66 to the current clamping circuitry 60, activating the current limiting mode. When current clamping is enabled (e.g., ON), the current limit in the current clamping circuitry 60 is reduced to $IL_{MAX1}$ from $IL_{MAX2}$ where $IL_{MAX1}$ is the maximum current allowed to be withdrawn from the fuel cell stack 16 after a current pulse and $IL_{MAX2}$ is the maximum current available to be withdrawn from the fuel cell stack 16 during steady state operation. Both $IL_{MAX1}$ and $IL_{MAX2}$ are configurable via hardware, and may depend upon operating characteristics of the particular fuel cell stack 16 in the fuel cell system 10.

Figure 6:
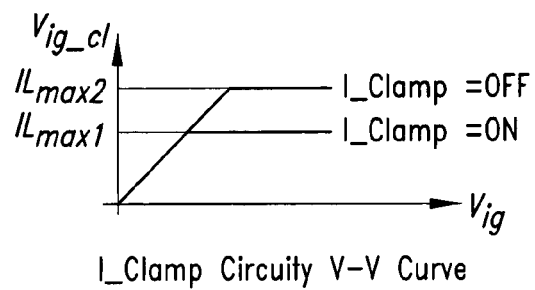
FIG. 6 is a graphical representation of exemplary input/output characteristics of current clamping circuitry which may be part of the control logic of FIG. 4.

FIG. 6 shows the input/output characteristics of current clamping circuitry 60 including $IL_{MAX1}$ from $IL_{MAX2}$ which are discussed in detail above.

Figure 7:
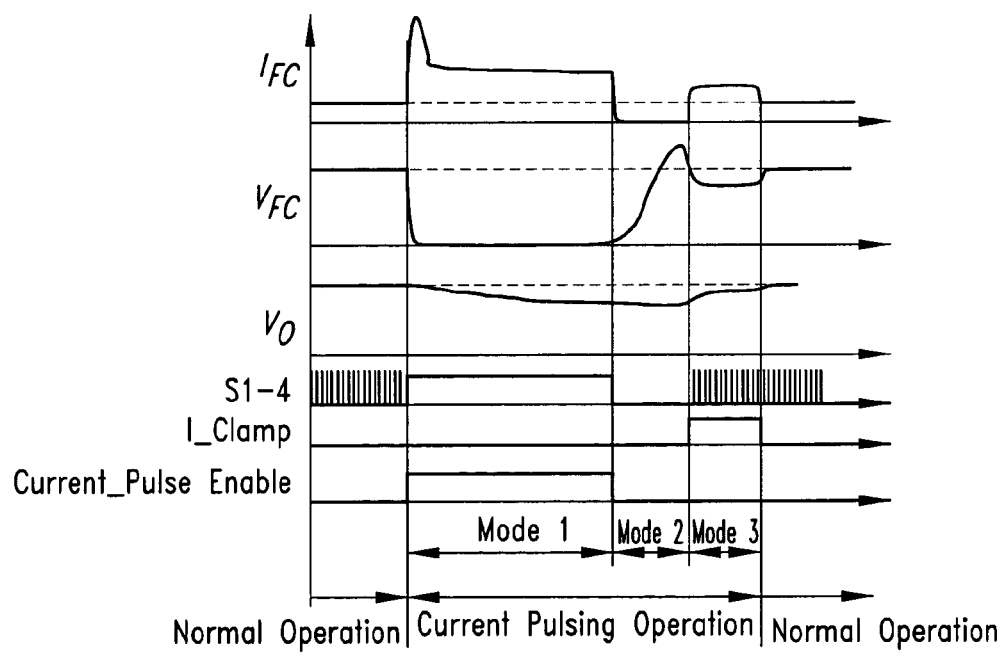
FIG. 7 is a graphical representation of various current and voltages with respect to signals for driving the DC/DC converter of the fuel cell system of FIG. 4 according to one illustrated embodiment.

FIG. 7 shows a graph of fuel cell current $I_{FC}$, fuel cell voltage $V_{FC}$, and output voltage $V_O$, along with timing diagrams for the switches $S_1$-$S_4$ on the primary side 52, the current clamping enable signal I_Clamp and the current pulsing enable signal CURRENT_PULSE ENABLE, according to one illustrated embodiment of operating the fuel cell system 10 of FIG. 4, where mode 1 corresponds to the current pulsing mode, mode 2 corresponds to the bridge-off mode and mode 3 corresponds to the current limiting mode.

During normal operation, the switches $S_1$-$S_4$ of the primary side 52 of the DC/DC power converter 12 are operated in a conventional manner to convert the fuel cell voltage $V_{FC}$ to a load or output voltage $V_O$ at the desired reference voltage $V_{O\_REF}$. Current pulsing operation occurs when the current pulsing enable signal CURRENT_PULSE ENABLE is activated by the fuel cell controller 18 (FIG. 1). The logic synthesis block 66 controls the DC/DC power converter 12 to execute the current pulsing mode, bridge-off mode, and current limiting mode sequentially, to implement a complete current pulsing operation.

The fuel cell controller 18 determines the duration of current pulsing mode. A pulse duration of approximate 20-300 microseconds may be suitable, while a frequency or period of one every 30-600 seconds may be suitable. During startup from storage, a longer pulse and/or more frequent pulsing may be desirable.

The fuel cell controller 18 also determines the duration of the bridge-off and current limiting modes, for example, via parameters stored in hardware and based on the characteristics of the type of fuel cell stack 16 in the particular fuel cell system 10. The switches $S_1$-$S_4$ on the primary side 52 of the DC/DC converter operate as a boost converter during normal operation mode, turning ON and remaining in the ON state during the current pulsing mode to generate the current pulse, turning OFF and remaining OFF during bridge-off mode, and finally operate as a boost converter during current limiting mode with a lower current limit than while the current clamping enable signal I_Clamp is enabled or ON.

Figure 8:
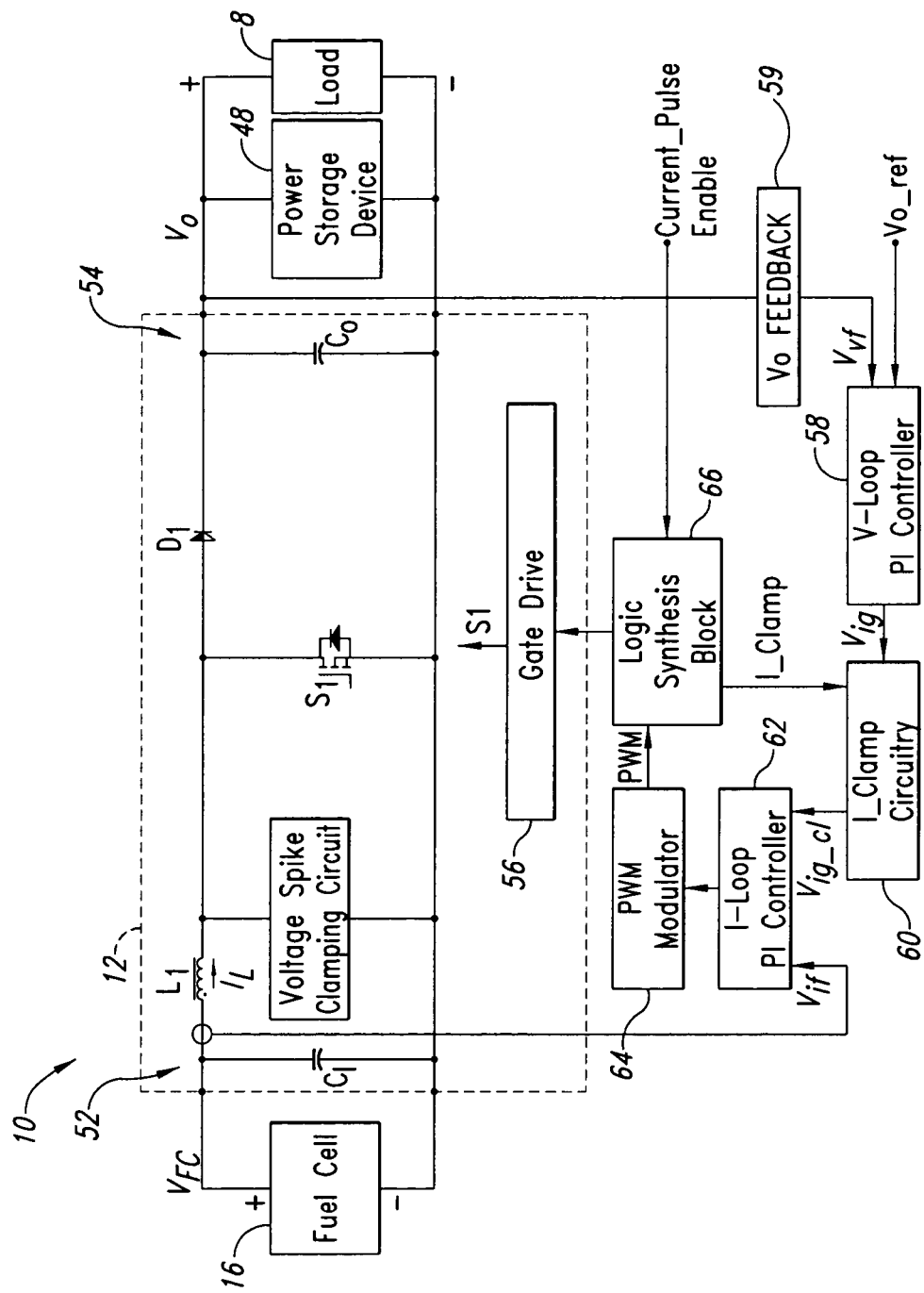
FIG. 8 is a schematic diagram of a fuel cell system powering an external load, the fuel cell system comprising a fuel cell stack, main DC/DC power converter, power storage device, and DC/DC power converter control logic, according to one illustrated embodiment.

FIG. 8 shows a further embodiment of the fuel cell system 10 according to another illustrated embodiment. The embodiment of FIG. 8 employs a non-isolated DC/DC power converter 12 in place of the isolated DC/DC power converter 12 of FIG. 4. The non-isolated DC/DC power converter 12 is illustrated as a single switch $S_1$ replacing the switches $S_1$-$S_8$ and the transformer T from the embodiment of FIG. 4. The non-isolated power converter 12 also comprises the boost inductor $L_1$.

Figure 9:
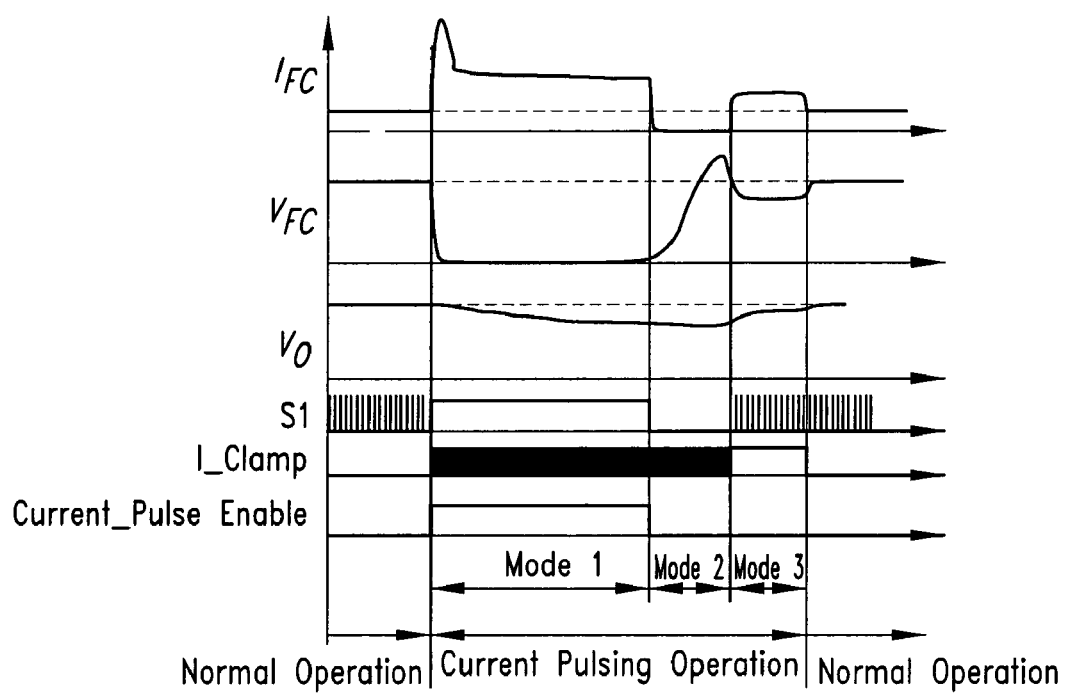
FIG. 9 is a graphical representation of various current and voltages with respect to signals for driving the DC/DC converter of the fuel cell system of FIG. 8 according to one illustrated embodiment.

FIG. 9 shows a graph of fuel cell current $I_{FC}$, fuel cell voltage $V_{FC}$, and output voltage $V_O$, along with timing diagrams for the switch $S_1$ on the primary side 52, the current clamping enable signal I_Clamp and the current pulsing enable signal CURRENT_PULSE ENABLE, according to one illustrated embodiment of operating the fuel cell system 10 of FIG. 8, where mode 1 corresponds to the current pulsing mode, mode 2 corresponds to the bridge-off mode and mode 3 corresponds to the current limiting mode.

As illustrated in FIG. 9, the current clamping enable signal I_Clamp can be activated prior to the start of the current limiting mode. For example, the current clamping enable signal may be activated at any time during the current pulsing and/or bridge-off modes, as illustrated by the shaded area in FIG. 9. In some embodiments it may be preferable to activate the current limiting logic in synchronization with a rising edge of the current pulsing enable signal CURRENT_PULSE ENABLE in order to give the current clamping circuitry 60 additional time to settle before the start of the current limiting mode.

Figure 10:
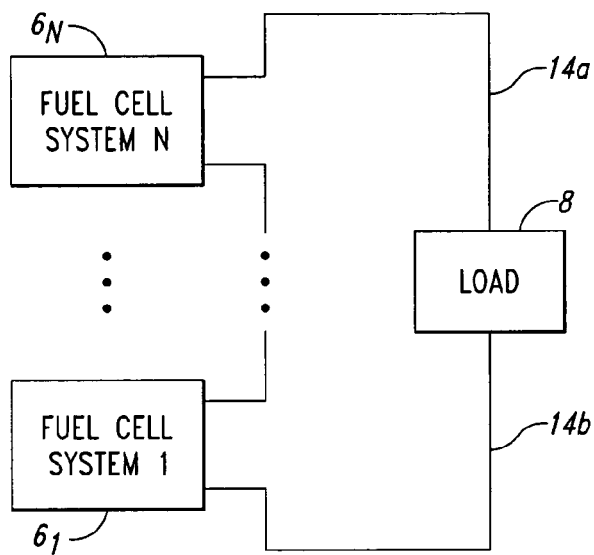
FIG. 10 is a schematic diagram of a number of fuel cell systems electrically coupled in series to supply a desired power a load at a desired voltage.
Figure 11:
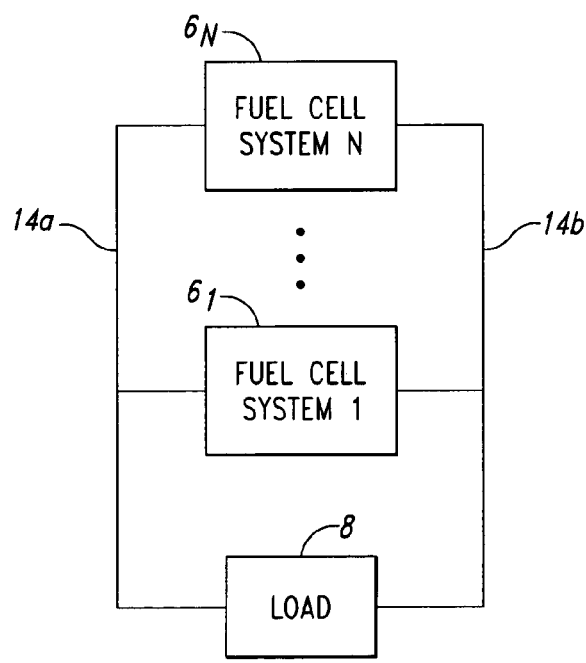
FIG. 11 is a schematic diagram of a number of fuel cell systems electrically coupled in parallel to supply power a load at a desired voltage.

The above teachings may be implemented in a modular approach to providing power supply systems of a large variety of output powers and voltages, as illustrated in FIGS. 10 and 11.

FIG. 10 shows a number of power supplies $6_1$-$6_n$ electrically coupled in series on a voltage bus 14 to power a load 8. The ellipses indicate that any number of additional power supplies may be electrically coupled between the first power supply $6_1$ and the $n^{th}$ power supply $6_n$. This modular approach allows customers to reconfigure a power supply system of a n times output power at n times output voltage while utilizing the same fuel cell stack design and the same power supply 6 module. A modular approach advantageously allows for redundancy in the system. That is, the system may be designed with some excess capacity and may provide sufficient power even though one or more modules fail.

FIG. 11 shows a number of power supplies $6_1$-$6_n$ electrically coupled in parallel on a voltage bus 14 formed by voltage rails 14a, 14b to power a load 8. This modular approach allows a customer to reconfigure a power supply system of a n times output power at the same voltage, while utilizing the same fuel cell stack design and the same power supply 6 module. The embodiments of FIGS. 10 and 11 can be combined in various series and parallel coupled arrangements to provide a modular approach to the manufacture, validation, and distribution of power supply systems.

In some applications employing multiple fuel cell systems 10, the power drawn from each fuel cell system 10 might differ due to slight differences between the fuel cell systems 10, for example, differences in the construction or operating life. In such applications it may be beneficial to ensure that the differences in power drawn between the fuel cell systems 10 is within some prescribed range. In one approach, power to the balance of plant (BoP), i.e., internal systems of fuel cell systems 10, may be provided through transformers to provide galvanic isolation, with the BoP grounded with reference to the fuel cell stack 12. The electric storage device 48 and load 8 are electrically isolated from BoP of the fuel cell system 10. The fuel cell controllers 18 of the various fuel cell systems 10 may be communicatively coupled via internal interface buses 21 (FIGS. 1 and 2).

In general, one might employ any of the load sharing methods that are known to those skilled in the art. For instance, there are well-known passive current sharing methods (e.g., the "droop" method), as well as active current sharing methods such as that described herein. Broadly speaking, load sharing may be based on current and/or on voltage. The balancing may thus be performed to obtain the same voltage, the same current, or some combination of both.

Additionally, currents from the fuel cell stacks of each of the fuel cell systems 10 may be reported to one or more fuel cell controllers 18 through the internal interfaces 21 (FIGS. 1 and 2), and the respective DC/DC power converters 12 operated to output a more balanced current with respect to one another. The voltage reference 34 to the DC/DC power converters 12 are appropriately adjusted by the fuel cell controller 18 to implement the current sharing between the fuel cell stacks 16.

Additionally, or alternatively, the fuel cell system 10 operating alone or in combination with other fuel cell systems 10 may employ a fan power control strategy.

The fan 26 may perform multiple functions in the fuel cell system 10. For example, the fan 26 may provide oxidant and/or coolant flow, may cool the power electronics, may dilute any vented or leaked hydrogen, and may circulate air heated by the fuel cell stack 16 and/or power electronics over water evaporators to assist in evaporation. For instance, the speed of the fan 26 may primarily be set based on the cooling requirement for the fuel cell stack 16. In this case, the air/oxidant flow (i.e., air stoichiometry) may merely need to be greater than a certain minimum. For hydrogen dilution, the air flow usually only needs to be greater than a certain minimum also. The power electronics, in particular the DC//DC converters 12, 50, simply should not be allowed to overheat. Thus, the fan 26 runs at or above a certain minimum speed. In the above, generally, a PID loop controls the fan speed in accordance with the stack temperature. Another PID loop may be used to limit the temperature of the DC/DC converters 12, 50. That is, the second PID loop overrides the fan speed control to ensure adequate cooling of the DC/DC converter 12, 50, if necessary, although this may result in the fuel stack 16 being cooled more than desired. Should the hydrogen level get too high, a hydrogen sensor may be used to detect this condition and shut down the fuel cell system 10. Of course, other fan control strategies are possible.

The disclosed embodiments may provide a number of advantages over existing systems. For example, the above described approaches may reduce the time required to produce a suitable power supply system that meets a customer's specific desired power and voltage requirements. Having a power supply system more closely tailored to the actual load requirements and/or capable of adjusting the output voltage via a power converter saves costs since fewer cells are required in the fuel cell stack 16, and since only a relatively few, or even only one, standard fuel cell stack 16 must be designed, validated, manufactured, inventoried and distributed. Further, having a power supply system more closely tailored to the actual load requirements allows the fuel cell stack 16 to operate more efficiently.

Use of the power converter to adjust the voltage, allows the fuel cell stack 16 to operate at maximum load, independent of the desired load voltage, also allowing the fuel cell stack to operate more efficiently along the optimum polarization curve. As noted above, the elimination of costly and lossy high voltage switches and/or diodes also adds to the savings in cost and efficiency. As further discussed above, the elimination of a dedicated power supply for the fan provides significant cost and efficiency savings. The coupling of the power storage device 48 across the load 8 provides significant saving by reducing the maximum power rating of the fuel cell stack 16. Even further, the main power converter 12 may from time-to-time, or as required, generate a current pulse to improve fuel cell stack performance.

Although specific embodiments of, and examples for, the power supply are described herein for illustrative purposes, various equivalent modifications can be made without departing from the spirit and scope of the present power converter architectures and methods, as will be recognized by those skilled in the relevant art. The teachings provided herein can be applied to other fuel cell systems, not necessarily the exemplary fuel cell systems generally described above.

The various embodiments described above can be combined to provide further embodiments. All of the above U.S. patents, patent applications and publications referred to in this specification, including but not limited to, commonly assigned pending U.S. patent application Ser. No. 10/017,480, entitled "Method and Apparatus for Controlling Voltage From a Fuel Cell System"; Ser. No. 10/017,462, entitled "Method and Apparatus for Multiple Mode Control of Voltage From a Fuel Cell System"; and Ser. No. 10/017,461, entitled "Fuel Cell System Multiple Stage Voltage Control Method and Apparatus", all filed Dec. 14, 2001; Ser. No. 60/421,126, entitled "Adjustable Array Of Fuel Cell Systems In Power Supply" filed May 16, 2002; Ser. No. 60/436,759, entitled "Electric Power Plan With Adjustable Array Of Fuel Cell Systems" filed Dec. 17, 2002; and Ser. No. 10/426,942 filed Apr. 29, 2003, entitled "POWER CONVERTER ARCHITECTURE AND METHOD FOR INTEGRATED FUEL CELL BASED POWER SUPPLIES", are all incorporated herein by reference, in their entirety.

Aspects of the present power converter architectures and methods can be modified, if necessary, to employ systems, circuits and concepts of the various patents, applications and publications to provide yet further embodiments of the present power converter architectures and methods. Suitable methods of operation may include additional steps, eliminate some steps, and/or perform some steps in a different order. For example, the fuel cell controller 18 may employ a different order for determining the operating state, and/or for opening and closing the switches $SW_1$, $SW_2$.

These and other changes can be made to the present power converter architectures and methods in light of the above-detailed description. In general, in the following claims, the terms used should not be construed to limit the invention to the specific embodiments disclosed in the specification and the claims, but should be construed to include all fuel cell systems that operate in accordance with the claims. Accordingly, the invention is not limited by the disclosure, but instead its scope is to be determined entirely by the following claims.

We claim:

1. A method of operating a fuel cell system comprising a main power converter having a first side and a second side, a fuel cell stack electrically coupled to the first side of the main power converter and a load electrically coupled to the second side of the main power converter, the method comprising:
   determining when to start a current pulsing operation; and
   selectively operating switches in the first side of the main power converter to produce a high current pulse from the fuel cell stack during a current pulsing operation as at least a portion of the current pulsing operation.

2. The method according to claim 1, further comprising:
   driving an inductor electrically coupled in series with the fuel cell stack and at least one switch in the first side of the main power converter into saturation during the current pulsing operation.

3. The method of claim 2 wherein said step of selectively operating switches on the first side of the main power converter comprises selectively operating the switches on the first side of the main power converter to electrically short the fuel cell stack during the current pulsing operation.

4. The method of claim 2 wherein said step of determining when to start a current pulsing operation includes at least one of:
   determining that a specified interval has passed; and
   determining that a voltage across at least a portion of the fuel cell stack has dropped below a threshold voltage.

5. The method of claim 1, further comprising: selectively operating switches in the second side of the main power converter to electrically isolate the main power converter from the load during at least a portion of the current pulsing operation.

6. The method of claim 1, further comprising:
   selectively operating switches in the first side and the second side of the main power converter to stop a current flow out of the second side of the main power converter during a bridge off period following the current pulsing operation.

7. The method of claim 6, further comprising:
   selectively operating switches in at least one of the first and the second sides of the main power converter to limit a current flow out of the second side of the main power converter to a defined threshold during a current limiting period following the bridge off period.

8. The method of claim 7, further comprising:
   selectively operating switches in at least one of the first and the second sides of the main power converter to boost/convert a current from the fuel cell to the load during a boost/converting period following the current limiting period to enter a normal operation.

9. The method of claim 8, further comprising:
   storing energy from the fuel cell stack in a power storage device electrically coupled across the second side of the main power converter during at least a portion of the boost/converting period; and
   releasing energy from the power storage device to the load during the current pulsing period.

10. The method of claim 9, further comprising:
    selectively operating switches in the second side of the main power converter to electrically isolate the main power converter from the load during at least a portion of the current pulsing period.

11. The method of claim 9, further comprising:

clamping voltage spikes with a voltage spike clamping circuit across the first side of the main power converter.

12. The method according to claim 1, wherein:

said main power converter comprises a bridge circuit which includes a plurality of first switches that are coupled to output terminals of said fuel cell system at said first side of said main power converter, and are operable to cause said power converter to supply power to said load during a boost operation; and said step of selectively operating switches comprises operating at least some of said first switches to electrically short circuit the output terminals of the fuel cell system during the current pulsing operation.

13. A method of operating a fuel cell system comprising a main power converter having a first side and a second side, a fuel cell stack electrically coupled to the first side of the main power converter and a load electrically coupled to the second side of the main power converter, the method comprising:

determining when to start a current pulsing operation; and selectively operating switches in the first side of the main power converter to produce a high current pulse from the fuel cell stack during a current pulsing operation as at least a portion of the current pulsing operation;

wherein said step of selectively operating switches in the first side of the main power converter comprises electrically operating a first pair of transistors in said main power converter to electrically couple a first pole of a primary side of a transformer to both a positive and a negative voltage rail and electrically operating a second pair of transistors in said main power converter to electrically couple a second pole of the primary side of a transformer to both the positive and the negative voltage rail.

14. A method of operating a fuel cell system comprising a main power converter having a first side and a second side, a fuel cell stack electrically coupled to the first side of the main power converter and a load electrically coupled to the second side of the main power converter, the method comprising:

determining when to start a current pulsing operation; and selectively operating switches in the first side of the main power converter to produce a high current pulse from the fuel cell stack during a current pulsing operation as at least a portion of the current pulsing operation;

wherein determining when to start the current pulsing operation includes determining that an interval of between approximately 30 and 600 seconds, inclusive, has elapsed.

15. A method of operating a fuel cell system comprising a main power converter having a first side and a second side, a fuel cell stack electrically coupled to the first side of the main power converter and a load electrically coupled to the second side of the main power converter, the method comprising:

determining when to start a current pulsing operation; and selectively operating switches in the first side of the main power converter to produce a high current pulse from the fuel cell stack during a current pulsing operation as at least a portion of the current pulsing operation;

wherein said step of selectively operating switches in the first side of the main power converter comprises selectively operating said switches in the first side of the main power converter to produce the high current pulse from the fuel cell stack for between 20 and 300 milliseconds, inclusive.

* * * * *